Aug. 29, 1933.   V. P. WRITER   1,924,531
METHOD OF MAKING HATS
Original Filed Jan. 4, 1930
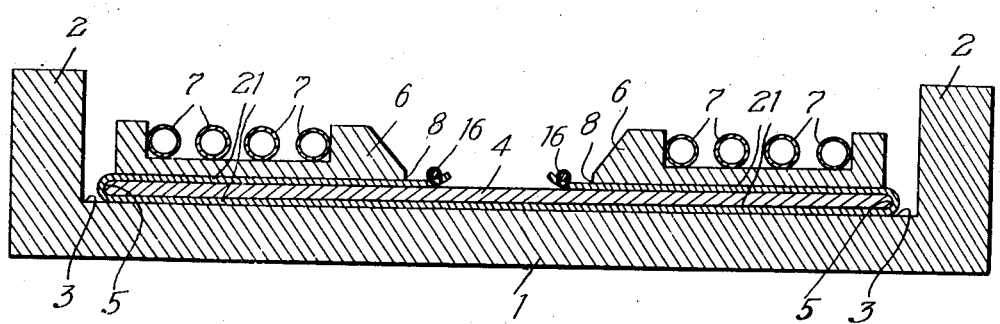
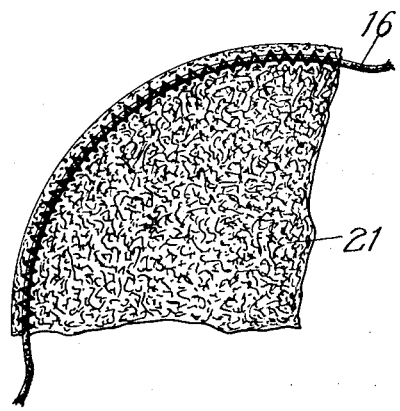 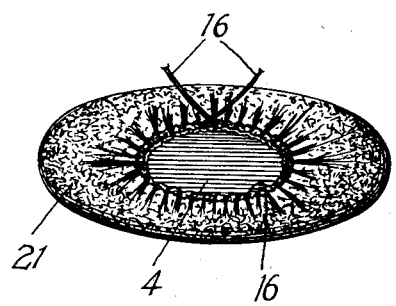
Inventor
Victor P. Writer
By his Attorneys
Kenyon & Kenyon Patented Aug. 29, 1933

1,924,531

UNITED STATES PATENT OFFICE 1,924,531

METHOD OF MAKING HATS

Victor P. Writer, New York, N. Y.

Original application January 4, 1930, Serial No. 418,461. Divided and this application November 19, 1930. Serial No. 496,584

3 Claims. (Cl. 223—31)

This invention relates to means and a method for the manufacture of hats, and relates particularly to the manufacture of the style of hats known as Tam O' Shanters or bérets. It will be described with particular reference to the manufacture of bérets.

This application is a division of my co-pending application Serial Number 418,461, filed January 4, 1930.

In the manufacture of hats of the type mentioned, especially when made out of non-woven cloth such as matted felt, or the like, it has been impossible to obtain a satisfactory béret made from a single piece of cloth except by slow hand methods of shaping which have been laborious and impracticable. I have heretofore discovered that satisfactory and rapid results in the manufacture of one piece bérets can be obtained by means of the machine and method disclosed and claimed in Letters Patent of the United States No. 1,725,500 issued to me on August 20, 1929. The present invention in one of its embodiments or applications relates to improved means to be used in connection with the machine and method of said patent, and to improvements in the method of manufacture therein disclosed.

It is an object of the present invention to provide means whereby bérets may be more rapidly fashioned, may be produced in a greater variety of texture and materials, and whereby the method of manufacture is very greatly speeded up and facilitated with accompanying improvement and standardization of the finished product. It is also an object of the present invention so to improve upon the process disclosed in my prior Letters Patent above referred to as to accomplish other objects hereinafter set forth.

In the drawing which accompanies this specification similar parts are designated by the same reference numerals throughout.

Fig. 1 is a cross-section of my béret making machine.

Fig. 2 shows the method of affixing the drawstring around the circumference of the cloth blank from which the béret is to be made.

Fig. 3 shows in perspective the cloth 21 of Fig. 2 drawn about the forming element 4, prior to insertion thereof in the press.

My béret making machine is shown in cross-section in Fig. 1. The lower die 1 has an upstanding flange 2 defining its marginal edge and provides a flat contacting surface 3 upon which the cloth rests during the pressing operation. The shaping element 4 is a flat circular disc having sufficient thickness at the edges to prevent injury to the cloth at the point of flexure and to permit it to move smoothly over said edges when the pulling and stretching operation takes place.

The upper die 6, 6 is annular in shape and contains a central opening as shown in Fig. 1, the size of which determines the head size of the hat which is to be made by the machine. Either or both of the dies, upper and lower, may be heated in any desired way. In ordinary practise I heat both by steam coils. In Fig. 1 I have shown steam coils 7, 7 arranged to heat the upper die 6. It will be understood that similar coils (not shown) may be employed to heat the lower die 1 or any other method of heating, such as gas or electricity, may be resorted to with respect to either the upper or the lower dies.

The method of operation employed in connection with my béret making machine is as follows: A circular cloth blank 21 of the desired material is cut of a suitable size and a drawstring or clip-cord 16 is attached around the periphery thereof by a crisscross stitch shown in plan view in Fig. 2 and in cross-section at 16 in Fig. 1. This material, while still dry, is drawn as tightly as required upon the shaping element 4, as shown in Fig. 3, by pulling tight the slip-cord 16. The material is then dampened with water and inserted between the dies in the machine which have been heated. The upper and lower dies are then brought into engagement with the material upon the former as shown in Fig. 1. Any means or method of causing these dies to exert pressure upon the cloth and shaping element between them may be employed. One such means and method is described in my issued patent, above referred to. When the upper and lower dies have thus been brought into engagement with the forming element as shown in Fig. 1, the drawstring 16 is manually tightened still further by the operator who works through the opening in the upper die and thus, in the presence of moisture and heat, the cloth 21 is pulled upwardly and radially inward over the periphery of the shaping element 4 toward its center. The effect of moisture and heat causes the material to stretch to a substantial degree when pulled by the drawstring and this stretching is an important feature of my method of making bérets. Hence the use of the drawstring is an important feature of the invention as it gives noticeably greater speed and efficiency to the entire operation. After the pulling has been completed the cloth is left in the press for a suitable length of time to facilitate drying the cloth and to permit it to acquire a proper set. This process, I have found, has the effect of causing all the wrinkles to concentrate in the waste material in the center opening and to leave a smooth surface elsewhere on the upper and lower surfaces of the shaping element. After a suitable length of time, which may be from three to ten minutes, a sharp cutting edge is applied at the point 8, 8 to sever the waste material gathered in the center of the press and in which all of the wrinkles have been concentrated. With some kinds of cloth materials, the cutting may be done immediately at the conclusion of the pulling operation, and before drying of the cloth is complete. When the cloth has become sufficiently dry, it is released from the pressure of the upper and lower dies and taken off the forming element. The material may then be turned inside out, and an elastic band affixed around the head opening in the usual manner.

I do not desire to be limited to the specific forms of the device shown in the accompanying drawing and specification, but intend that the same shall embrace all forms of the invention falling within the scope of the appended claims.

I claim

1. The steps in the method of manufacturing hats which comprise attaching a drawstring near the periphery of a blank of hat-forming material, drawing the periphery of said blank by means of said drawstring radially inward over the upper face of a forming element a substantial portion of whose upper face adjacent its edge lies in a plane parallel to the plane of its under face, moistening said material, compressing the material upon the parallel faces of said forming element between heated dies for a sufficient length of time to cause the material to set to the desired shape and trimming away waste material containing said drawstring to form a head-opening in said hat.

2. The process of making hats which comprises securing a drawstring in slidable relation adjacent the marginal edge of a blank of hat-forming cloth, drawing the blank by means of said drawstring around a forming element so as to partially envelop the same, holding the marginal edges of said blank in contracted circular position adjacent the upper central portion of said forming element, pressing the cloth blank upon said element in the presence of heat and moisture to cause the cloth to conform to the shape thereof, and cutting away the contracted marginal edge of said blank containing said drawstring to form a head-opening in said hat.

3. The process of making hats which comprises attaching a drawstring adjacent the marginal edge of a blank of hat-forming cloth, drawing said blank by means of said drawstring around a forming element, holding the marginal edge of said blank by means of said drawstring in contracted position adjacent said forming element, pressing a portion of said blank against said forming element in the presence of heat and moisture, and trimming away waste material containing said drawstring to form a head-opening in said hat.

VICTOR P. WRITER.